Feb. 28, 1939.     G. D. BUCK     2,148,977
HOLLOW PLUG FOR WALLS
Filed Sept. 6, 1938
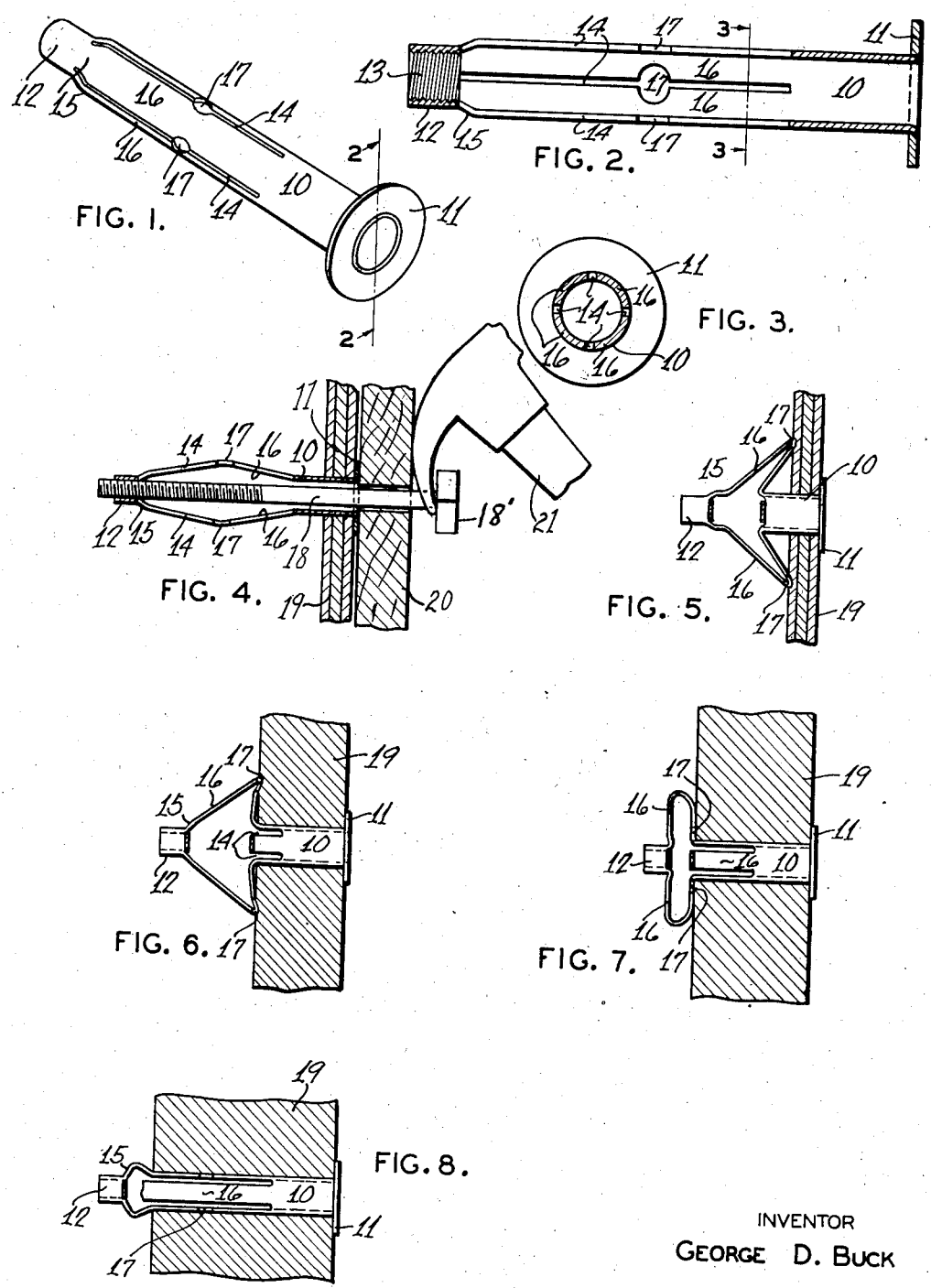
INVENTOR
GEORGE D. BUCK Patented Feb. 28, 1939

2,148,977

UNITED STATES PATENT OFFICE 2,148,977

HOLLOW PLUG FOR WALLS

George D. Buck, St. Louis, Mo.

Application September 6, 1938, Serial No. 228,546

2 Claims. (Cl. 85—40)

It is often desirable to attach objects to the walls of buildings, but as many such walls are formed of plaster or wall board or the like, it is extremely difficult to attain such a result due to the inability of such walls so constructed to hold screws or nails. I am aware that hollow plugs similar to my general idea herein disclosed have been known and used in such walls, but I believe that I am the first to produce such a plug inserted through a hole in the wall just large enough to receive said plug, and said plug may be easily and readily secured in placed by means of a prebending arrangement, which I have discovered and which permits the application of my new plug to walls of differing thicknesses with a minimum of effort and security of attachment.

The principal object of my invention is to so form my plug that I secure a bending point where, upon the application of pressure, the walls of the plug are caused to instantly start to bend or bulge outwardly, and which bending movement may be transferred to another section of the plug previously weakened so as to permit such bending movement at such last-named section to take place by extending longitudinal slots down through and to a point where the prebent portion of my new plug merges with an end portion thereof of smaller diameter. By such prebending and by the use of such longitudinal slots, so arranged and passing through such prebent portion of the plug, I can secure the attachment of my new plug to walls varying in thickness from one-eighth inch up to and including one and one-half inch.

A further object is to provide a hollow plug firmly held to both sides of a wall, in which a suitable screw may be applied to said plug to attach an object to the wall. A still further object is to provide a plug with means for expanding the portion of said plug extending through the wall by drawing or pulling one end of the plug inwardly, thus bulging the slotted portion of said plug.

The invention will be readily understood from the following description and from the drawing hereto attached.

Fig. 1 is a perspective view of my new plug.

Fig. 2 is a longitudinal view in cross-section taken on line 2—2, Fig. 1.

Fig. 3 is a transverse section taken on line 3—3, Fig. 2.

Fig. 4 is a longitudinal, sectional view taken through my new plug, with a section of wall through which said plug is passed, and a headed screw for collapsing said plug when said bolt is passed through said plug.

Fig. 5 illustrates the plug shown in Fig. 4 fully collapsed, but before the screw by which such collapsing was secured has been removed from the plug.

Figs. 6, 7, and 8 show my new plug applied to walls of varying thicknesses.

My device comprises a tubular member 10 with a circular flange 11 secured to one end thereof. The opposite end of the tubular member is swaged, as shown at 12, and I preferably provide screw-threads 13 interiorly of such swaged end. I preferably cut my tubular member from a steel tube section which can be secured on the open market in specified lengths and is reasonably priced, so that my plugs are not expensive. I can, of course, use plugs formed from other metals in tubular form, such as brass, aluminum, etc., but I have found the steel tubing will readily bulge under the pressure applied and is best suited to my purpose for general conditions.

Intermediate the ends of the tubular member 10 I provide a series of elongated slots 14 in the wall thereof which extend from a point near the flanged end through the curved portion 15 and to a point where the swaged portion 12 straightens out, as clearly shown in Figs. 1 and 2. By this arrangement I provide a prebent section of the longitudinal parts 15. I also provide, preferably, circular openings 17 about midway of the plug 10 which serve to weaken the longitudinal parts 16 to cause said plug to bend or bulge transversely at such weakened portions.

Preferably I form the flange 11 separate from the tubular member 10 and attach it to said member by pressing the same thereon, the tubular member 10 passing through a circular opening provided in said flange 11. I can then expand such end of said tubular member 10 firmly against the inside, perforated portion of said flange 11.

When it is desired to apply my plug to a wall, I bore a hole through such wall of a size to permit my said plug to pass snugly therethrough with the inner surface of the flange 11 contacting against the outer surface of said wall, as seen clearly in Figs. 4 to 8, inclusive. I then pass a screw 18 through the plug, threading it into the threaded end 12. By pressure applied to said screw 18 by passing the head 18' of said screw through a hole in a board 20, as shown in Fig. 4, and then gripping said screw between the head 18' and the board 20 in the claw of a hammer 21, or by using a device which tends to withdraw the screw 18 longitudinally of the tube, or by the use of an expanding tool such as shown in my Patent No. 2,115,251, I can collapse or bulge said tube, which extends inwardly from the inner surface of the wall 19, until the outer part of the bend contacts with the inner surface of the wall 19. This bending or bulging movement is greatly facilitated by reason of extending the longitudinal slots 14 through the prebent portion 15 of said plug 10 to the smaller diameter end portion 12. The moment such bending commences, the sections 16 will start to bend outwardly at the weakened part where the holes 17 (or other weakening means) have been provided. In Fig. 8 I have shown my plug inserted through a wall of one and one-half inch thickness, and where the plug is bent outwardly at the prebent portion 15.

When my plug 10 has been expanded inside the wall 19, I withdraw the screw 18 and then any suitable member may be fastened into position against the exposed surface of the wall 19, said bolt passing through the plug 10 and being threaded into the screw-threads 13 in the end 12.

I claim:

1. A hollow plug for walls comprising an undistorted tubular member, a flange at one end thereof, said tubular member terminating in a reduced portion at the other end of said plug, and longitudinal members in said tubular member formed by a series of slots, said slots extending into the reduced portion thereof thereby causing said plug to bulge outwardly when collapsing pressure is applied to said plug at its ends.

2. A hollow plug for walls comprising an undistorted tubular member, a flange at one end thereof, said tubular member terminating in a reduced portion at the other end of said plug, longitudinal members in said plug weakened intermediate their length and formed by a series of slots in said plug, said slots extending into the reduced portion thereof thereby causing said plug to bulge outwardly at such weakened portions when collapsing pressure is applied to said plug at its ends.

GEORGE D. BUCK.